US010979367B2

(12) United States Patent
Sergeev et al.

(10) Patent No.: US 10,979,367 B2
(45) Date of Patent: Apr. 13, 2021

(54) DEVICE AND METHOD OF FORWARDING DATA PACKETS IN A VIRTUAL SWITCH OF A SOFTWARE-DEFINED WIDE AREA NETWORK ENVIRONMENT

(71) Applicant: ADVA OPTICAL NETWORKING SE, Meiningen (DE)

(72) Inventors: Andrew Sergeev, Kfar Saba (IL); Eli Angel, Ra'anana (IL)

(73) Assignee: ADVA OPTICAL NETWORKING SE, Meiningen (DE)

( * ) Notice: Subject to any disclaimer, the term of this patent is extended or adjusted under 35 U.S.C. 154(b) by 146 days.

(21) Appl. No.: 16/270,163

(22) Filed: Feb. 7, 2019

(65) Prior Publication Data

US 2019/0245811 A1 Aug. 8, 2019
US 2020/0044986 A2 Feb. 6, 2020

(30) Foreign Application Priority Data

Feb. 8, 2018 (EP) ..................................... 18155798

(51) Int. Cl.
*H04L 12/931* (2013.01)
*H04L 12/935* (2013.01)
(Continued)

(52) U.S. Cl.
CPC .............. *H04L 49/70* (2013.01); *H04L 45/50* (2013.01); *H04L 45/586* (2013.01); *H04L 49/25* (2013.01);
(Continued)

(58) Field of Classification Search
CPC ....... H04L 45/50; H04L 45/586; H04L 49/25; H04L 49/30; H04L 49/70; H04L 63/02; H04L 63/1416
See application file for complete search history.

(56) References Cited

U.S. PATENT DOCUMENTS 9,166,988 B1 10/2015 Shin et al.
2012/0317566 A1 12/2012 Santos et al.
(Continued)

OTHER PUBLICATIONS

EPO, Extended European Search Report, dated Jul. 19, 2018, re European Patent Application No. 18155798.4.

*Primary Examiner* — Brian P Cox
(74) *Attorney, Agent, or Firm* — Perry + Currier, Inc.

(57) ABSTRACT

A method, device, and computer-program product of forwarding data packets in a virtual switch is provided. The virtual switch comprises: first, second and third virtual ports for respectively receiving/transmitting: LAN traffic from/to a physical LAN port; secured traffic from/to a physical secured traffic port; and Internet traffic from/to a physical Internet port. The method comprises: determining, for selected data packets of the outbound traffic, signature information; storing the signature information and information identifying associated packets; outputting the outbound traffic for processing by a virtual machine; receiving at least a portion of the outbound traffic as outbound secured traffic for supply to the secured port; determining whether each data packet of the outbound secure traffic matches the dedicated signature information and responsively controlling the forwarding of the respective data packet as part of the outbound secured traffic to the secured port and/or creating a SUSPICIOUS SOURCE alarm.

18 Claims, 4 Drawing Sheets

(51) Int. Cl.
*H04L 12/713* (2013.01)
*H04L 12/723* (2013.01)
*H04L 12/947* (2013.01)
*H04L 29/06* (2006.01)

(52) U.S. Cl.
CPC .............. *H04L 49/30* (2013.01); *H04L 63/02* (2013.01); *H04L 63/1416* (2013.01)

(56) References Cited

U.S. PATENT DOCUMENTS

2013/0094515 A1* 4/2013 Gura .................... H04L 63/123
370/419
2017/0353433 A1* 12/2017 Antony ............... H04L 63/0263

\* cited by examiner

DEVICE AND METHOD OF FORWARDING DATA PACKETS IN A VIRTUAL SWITCH OF A SOFTWARE-DEFINED WIDE AREA NETWORK ENVIRONMENT

The invention relates to a method of forwarding data packets in a virtual switch of a software-defined wide area network (SD-WAN) environment. The invention further relates to a network interface device which is configured to implement the method as well as to a computer program product stored which is configured to cause a computer to perform the method.

In conventional communication networks, required network functions, such as firewalls, network address translation (NAT), routers and load balancers, are provided as physical network functions using dedicated hardware appliances at each site where the respective physical network functions are required. In order to facilitate network management, increase agility and flexibility and cut down costs, especially hardware costs, network functions virtualization (NFV) is an emerging approach. NFV transforms network functions that have previously been performed by proprietary hardware appliances into virtual network functions (VNF). A virtual network function is a functional block within a network infrastructure and has well-defined external interfaces and a well-defined functional behavior. According to the NFV approach, network functions can be implemented by means of an application software that runs on standardized hardware, wherein a virtualization layer provides virtual interfaces that can be used by the application software to implement the desired network functions. The virtualization layer connects the physical hardware (which includes the physical interfaces) and provides the interfaces for the software that deploy the VNFs. The totality of all hardware and software components that build up the environment in which VNFs are deployed is referred to as network functions virtualization infrastructure (NFVI). The NFVI can span across several locations, e.g. places where data centers are operated. The network providing connectivity between these locations is regarded to be part of the NFVI. NFVI and VNF are the top-level conceptual entities in the scope of network function virtualization.

The virtualization layer of an NFVI provides a virtual computing component comprising one or more virtual platforms, a virtual storage component and a virtual network component. The individual virtual platforms of the virtual computing component can be of different types, e.g. virtual machines, virtual containers etc. A virtual machine is a software implementation of a machine (i.e. a computer) that executes programs like a physical machine. Each virtual machine can have its own memory space on the physical computing system, and can implement its own operating system. A container includes a respective application and all of its dependencies, but shares the kernel with other containers. A container runs as an isolated process in user space on the host operating system. A virtual platform may also run software applications or modules that realize one or more VNFs.

A virtual switch, i.e. the virtual ports thereof, and its functionality may be defined by the virtual network component and the virtual computing component, wherein the computing component implements the functionality of the virtual switch, i.e. its switching or routing functionality. For this purpose, an appropriate software application or software module may run on a virtual platform.

When setting up a software-defined wide area network (SD-WAN), usually a firewall is implemented as a VNF by the SDN or SD-WAN vendor. This means that the vendors usually rely on their software in order to secure the SDN against attacks, especially attacks affecting the traffic, i.e. the data packets, received from or supplied to an endpoint of a secured transmission path, like a multi-protocol label switching transmission path. However, this approach does not seem to be robust enough.

Especially, if an SD-WAN comprises a network site (e.g. a branch, head-end, data center, corporate network, each of which may consist of a LAN or a single network node) that is connected to one or more other network sites using the Internet or any other public cloud as transport medium and to the same or further network sites using a secure transport medium, e.g. multi-protocol label switching domain, it is desirable that traffic leakage from the Internet or public cloud into a secure connection can at least be detected in order to create an alarm and/or to control the forwarding of the traffic to the respective physical secured traffic port. It might further be desirable to control the forwarding of the data packets of the inbound LAN traffic which comprises data packets that have been received via the (insecure or unsecured) Internet or public cloud transport medium and data packets that have been received via the secure transport medium.

It is thus an object of the present invention to provide a method of forwarding data packets in a virtual switch of a software-defined wide area network (SD-WAN) environment which allows to control the forwarding of the outbound secured traffic to the respective physical secured traffic port and the forwarding of the inbound LAN traffic that comprises the inbound secured traffic and the inbound internet traffic to the respective physical LAN port. Especially, the method shall be easy to be implemented in a network interface device by hardware or a combination of hardware and software or firmware. Finally, it is an object of the invention to provide a network interface device and a software that are appropriate to implement the method according to the invention.

The invention achieves these objects with the combinations of features of claims 1, 6, 13 and 15, respectively.

The invention starts from the finding that a dedicated signature information is determined for each packet of the outbound LAN traffic that is received at the at least one physical LAN port and directed to the at least one first virtual port of the virtual switch. This dedicated signature information can be stored in a table within a storage or storage area of a respective network interface device. The outbound LAN traffic may then be output at the first virtual port to a virtual machine (VM) which provides one or more VNFs, e.g. a switching or routing function. At least part of the outbound LAN traffic which forms the outbound secured traffic is received at a second virtual port. Each data packet of the outbound secured traffic is checked as to whether it matches one of the pieces of dedicated signature information. The result of this check is then used to control the forwarding of the respective packet to the respective at least one physical secured port. If the packet matches the respective dedicated signature information, it is forwarded to the respective at least one physical secured port. If not, this information can be used to create a SUSPICIOUS SOURCE alarm if a predetermined condition for creating a SUSPICIOUS SOURCE alarm is met. In this way, it is possible to detect traffic leakage from the Internet or public cloud interface to a secure connection interface.

It shall be mentioned that the term "packet" is used in this description as a general term for any type of data transmission that uses data units having a defined length (i.e. a defined number of bits or bytes) and structure. For example, an internet frame would also be referred to as "packet" using this definition.

Further, it shall be mentioned, that the term "Internet" is used throughout this description as a general term for any public transport medium.

In an embodiment of the invention, the outbound secured traffic is forwarded, in a normal operating mode, to the at least one physical secured port and, in case a SUSPICIOUS SOURCE alarm has been created, only the packets matching the dedicated signature information and, as the case may be, the packets matching an exemption criterion are forwarded. Alternatively, the outbound secured traffic may be completely interrupted. The term "interrupted" here means that all packets are not forwarded to the respective physical secured port. That is all the packets can be completely discarded or forwarded towards a monitoring port for further analysis or other purposes. Even if the traffic is not completely interrupted but only the packets not matching the signature information or an exemption criterion are not forwarded to the respective physical secured port, the packets that are not forwarded may be supplied to a monitoring port.

It would, of course, also be possible to create a SUSPICIOUS SOURCE alarm only, i.e. without further automatically controlling the forwarding of the outbound secured traffic.

According to a further embodiment, the outbound secured traffic is interrupted if a predetermined condition for a higher level SUSPICIOUS SOURCE alarm is met. Of course, the predetermined condition for the higher level SUSPICIOUS SOURCE alarm is a more rigorous condition than the condition for the (normal) SUSPICIOUS SOURCE alarm.

In a specific embodiment, the SUSPICIOUS SOURCE alarms and/or the higher level SUSPICIOUS SOURCE alarms can be created on the basis of a SUSPICIOUS SOURCE statistics, which preferably comprises information concerning the number of packets of the traffic examined not matching the dedicated signature information and, as the case may be, not matching an exemption criterion in a given preceding time interval or in a total number of preceding packets.

For example, the SUSPICIOUS SOURCE statistics may comprise the number of packets, which, in a given preceding time interval or in a total number of preceding packets, do not match the dedicated signature information and, as the case may be, do not match an exemption criterion. The SUSPICIOUS SOURCE alarm or the higher level SUSPICIOUS SOURCE alarm may be created if a predetermined threshold value is exceeded. Of course, the threshold value for creating a higher level SUSPICIOUS SOURCE alarm will be chosen higher than the threshold value for creating the (normal) SUSPICIOUS SOURCE alarm.

In an embodiment of the invention, one or more exemption criteria may be comprised in an exemption criteria list, which may be stored in a storage, preferably a storage that is not accessible by a virtual machine providing virtualized network functions. In this way, inadmissible changes of the exemption criteria, e.g. caused by infected software, can be avoided or at least be made more difficult.

According to the invention, instead of or in addition to determining dedicated signature information for all packets of the outbound LAN traffic and checking as to whether the packets of the outbound secured traffic match the respective dedicated signature information, it is possible to determine dedicated signature information for all packets of the inbound secured traffic and to check as to whether the packets of the inbound LAN traffic match the respective dedicated signature information. In this way, it is possible to identify the packets of the inbound secured traffic within the inbound LAN traffic and to control the forwarding of packets thereof to the at least one physical LAN port.

For example, the forwarding can be controlled in such a way that the packets that match the dedicated signature information (i.e. the packets which have been recognized as having been received as secured traffic) are forwarded with a higher priority than the remaining packets which belong to the inbound Internet traffic. To define a lower and higher priority, a respective admissible latency or packet loss rate may be used. For example, the packets matching the dedicated signature information may be forwarded at any rate (i.e. with a desired zero packet loss rate) and an admissible latency X. The remaining packets are forwarded only if there is enough time left and in case a maximum admissible latency Y for the remaining packets is exceeded (wherein the value X is greater than the value X), the respective packets are discarded.

Of course, this specific method to control the forwarding of the packets of the inbound LAN traffic taking into account different priority levels may also be applied in order to control the forwarding of the outbound secured traffic.

According to a further embodiment of the invention, the signature information can be obtained by applying a Hash function on the respective data packet, wherein a respective Hash value is used as the signature information.

In a specific embodiment, a predetermined number of bytes or bits following the header of the respective packet (i.e. a predetermined number of bytes or bits of the packed payload) is used for determining the dedicated signature information, e.g. by applying an appropriate Hash function. Of course, any predetermined portion of the payload of a packet may be used to determine the dedicated signature information instead of using a portion of the payload that follows the packet header.

It is further possible to determine the length of the payload portion that is used to determine the dedicated signature information depending on the length of the packet. Especially, for packets having a length of greater than N1 (measured in bits or bytes), a first Hash function that uses M1 bytes (e.g. 16 bytes) may be used whereas for packets having a length of equal or less than N1 a second Hash function that uses M2 bytes (e.g. 8 bytes) may be used.

As already mentioned above, the secured traffic may be realized as multi-protocol label switching (MPLS) traffic, wherein the inbound MPLS traffic is received at and the outbound MPLS traffic is output at a physical MPLS port.

A network interface device according to the present invention is configured to define a virtual switch that comprises at least one first virtual port which is configured to receive outbound LAN traffic from and to transmit inbound LAN traffic to at least one physical local area network (LAN) port, at least one second virtual port which is configured to receive inbound secured traffic from and to transmit outbound secured traffic to at least one physical secured traffic port, and at least one third virtual port which is configured to receive inbound Internet traffic from and to transmit outbound Internet traffic to at least one physical Internet port. The network interface device is further configured to perform the method according to any of the preceding claims. Of course, the network interface device comprises hardware, especially computing hardware, and software (which may be at least partly realized as firmware) that is required to implement the method according to the invention.

Especially, such a device may serve as a layer 2/layer 3 (L2/L3) demarcation unit. This unit may further be upgraded with an NFV server, i.e. a server that is configured to realize the desired VNFs, especially the function of a virtual switch or router.

According to the invention, a computer program product stored on a non-transitory computer usable medium may comprise a program code which is configured to cause a computer to perform the method according to the invention.

Further objects and advantages of the present invention will become apparent from the following description of a preferred embodiment that is given by way of example with reference to the accompanying drawings, wherein.

Figure 1:
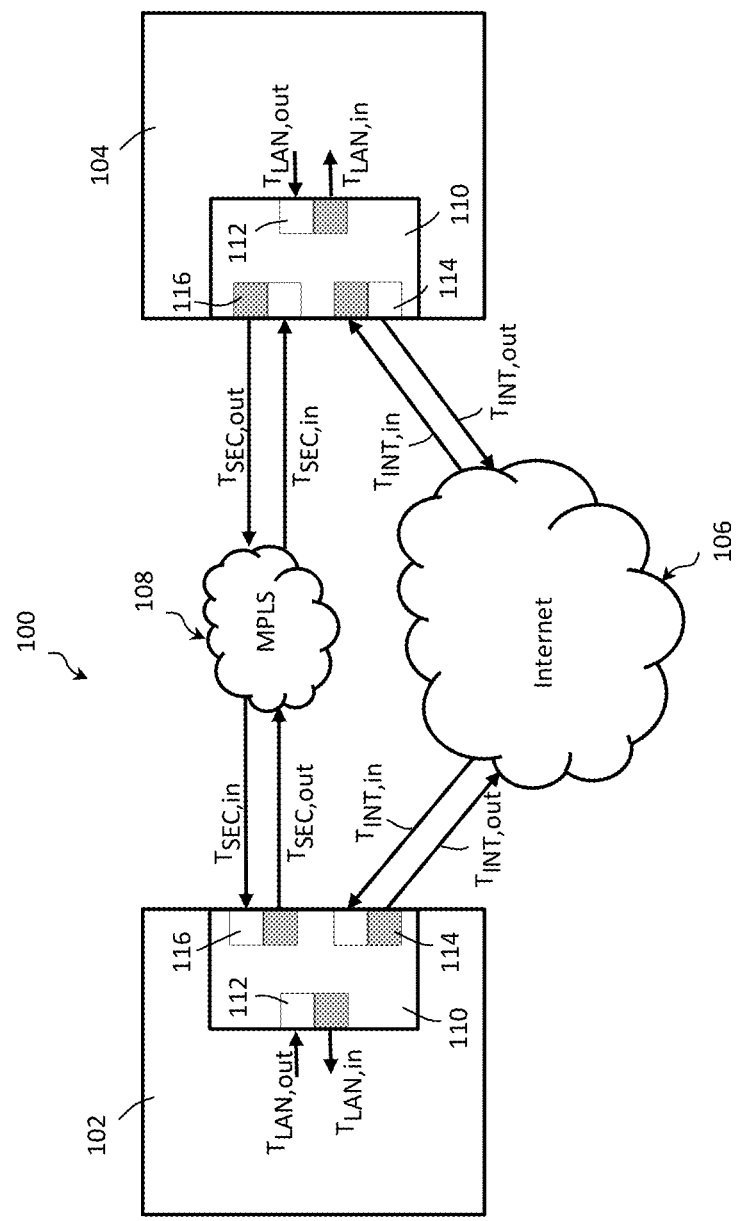
FIG. 1 shows a schematic representation of a WAN comprising two sites, e.g. a branch and a head-end or corporate network, that are connected via the Internet or a public cloud and via secured connection, e.g. an MPLS connection, wherein each site comprises a network interface device which is configured to provide NFV.
Figure 3:
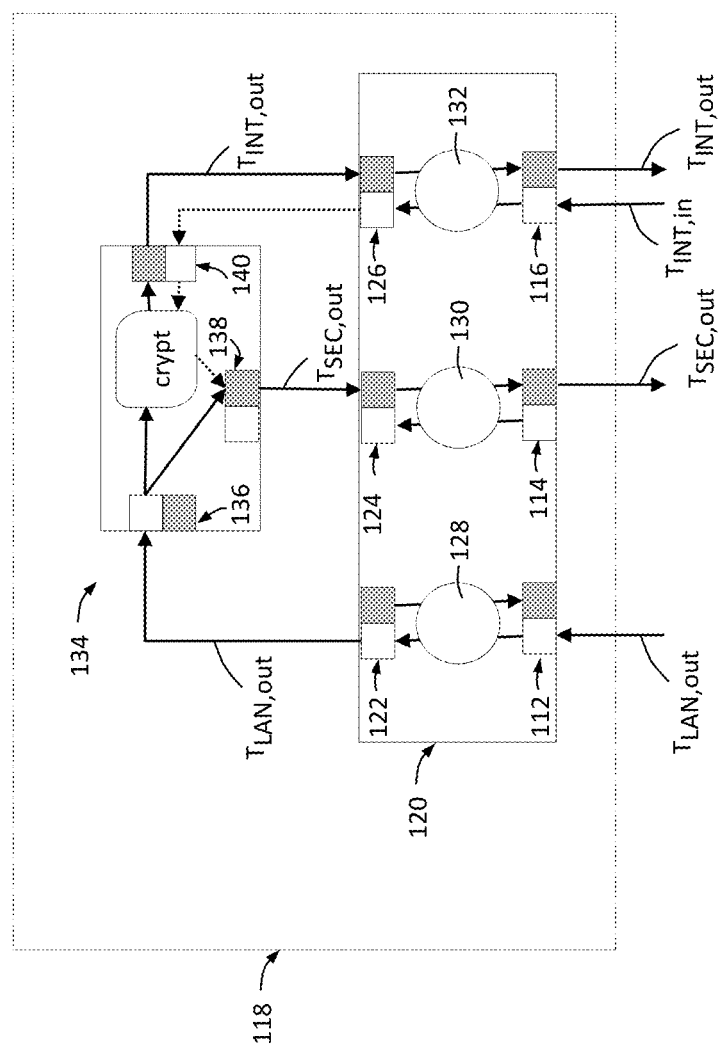
Figure 4:
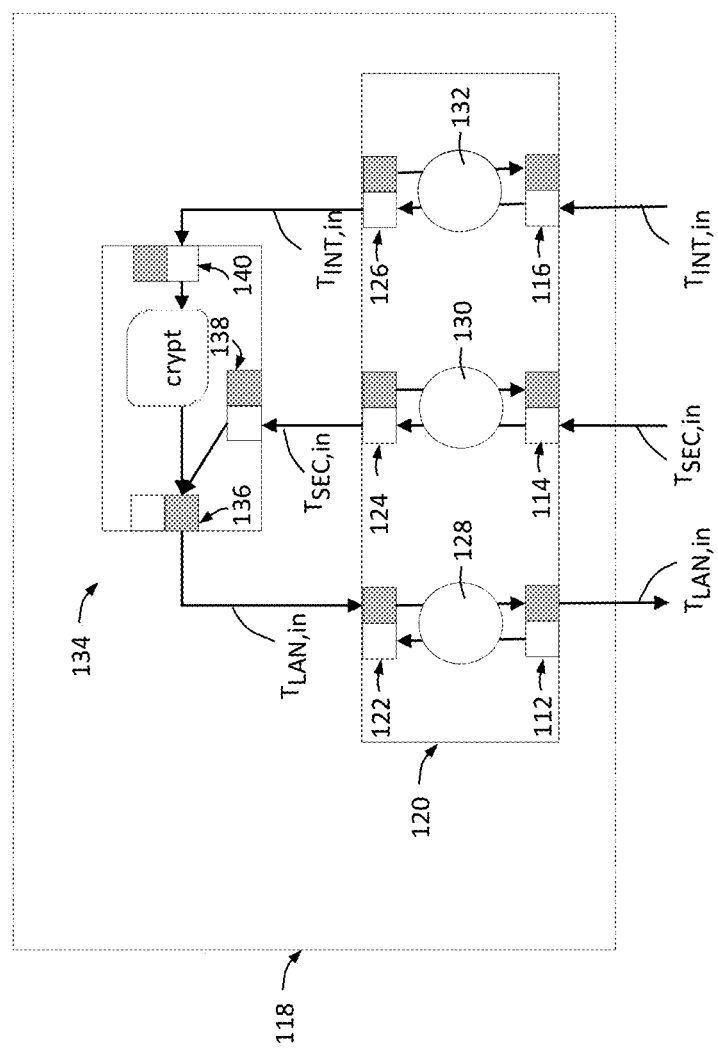

FIG. 3 shows the compute node of FIG. 1 in an operation mode in which outbound LAN traffic is split into outbound secured traffic and outbound Internet traffic, wherein inbound Internet traffic leaks into outbound secured traffic; and FIG. 4 shows the compute node of FIG. 1 in an operation mode in which inbound secured traffic and inbound Internet traffic is combined into inbound LAN traffic, wherein priorisation of the inbound secured traffic portion is performed.

FIG. 1 shows a schematic representation of a WAN 100 comprising a first and a second site 102, 104, wherein the first site 102 may for example be a corporate network and the second site 104 a branch office. Of course, each site 102, 104 comprises a LAN having a plurality of network nodes, e.g. personal computers, switches etc., or consists of a single network node, only. The latter case may be regarded as a LAN consisting of a single network node. Of course, the WAN 100 may comprise not only two but a plurality of sites that are connected with each other.

As shown in FIG. 1, the WAN 100 is a hybrid WAN, wherein the corporate network 102 is connected to the branch office 104 via an Internet connection 106, which uses the Internet or any other type of public cloud 106 as a transport medium, and via a secured connection 108. This secured connection 108 may for example be an MPLS connection.

It shall be noted in this respect that the terms "secured traffic", "secured traffic port", "secured connection" and "secured path" as used throughout this description do not exclusively mean that the data traffic transported in this way is necessarily secured against tapping or other external attacks. Rather, these terms may instead or additionally imply that such a connection or path grants a predetermined (minimum) bandwidth or transmission quality (e.g. a maximum bit error rate) or a maximum latency (measured between the transmitting and receiving node). In fact, an MPLS connection is usually used to transport traffic without encryption; however, as an MPLS domain exists as a separate domain, such a connection is usually safer (with respect to tapping or even changing or distorting the information transported) than a connection that uses the Internet or any other public cloud as a transport medium.

Using these two different connections makes it possible to drastically cut down costs as the Internet connection 106 is decisively less expensive than the secured connection 108.

The secured or MPLS connection 108 provides the following advantages over the Internet connection 108: It grants a high security as the data traffic is completely separated from the Internet or any public cloud and supplied to the (separate) MPLS domain by exclusive connections (tunnels); the label switching grants lower or even minimum latencies and jitter; it provides the use of class of service (CoS); the MPLS network is operated by the MPLS provider, especially the network configuration and routing is performed by the MPLS provider. Often, service level agreements (SLA) are concluded between the user and the MPLS provider, which grant a desired quality and network availability. However, as already mentioned, an MPLS connection is much more expensive than an Internet connection, e.g. an internet connection that uses the Internet protocol security (IPsec) protocol suite.

Each site 102, 104 comprises a network interface device 110 which is configured to provide NFV. Each network interface device 110 is capable of receiving outbound LAN traffic $T_{LAN,out}$ from the respective site 102, 104 at a (bidirectional) physical LAN port 112 and of routing this traffic to a (bidirectional) physical Internet port 116 and/or to a (bidirectional) physical secured traffic port 114, i.e. the outbound LAN traffic $T_{LAN,out}$ is either exclusively routed to the Internet port 114 or to the secured traffic port 116 or the outbound LAN traffic is split and a respective portion thereof is routed to each of the ports 114, 116. The portion of the outbound LAN traffic $T_{LAN,out}$ that is routed to the Internet port 114 is output at this port as outbound Internet traffic $T_{INT,out}$ and the portion of the outbound LAN traffic $T_{LAN,out}$ that is routed to the secured traffic port 114 is output at this port as outbound secured traffic $T_{SEC,out}$.

Likewise, the network interface devices 110 are capable of receiving an inbound secured traffic $T_{SEC,in}$ (also referred to as inbound MPLS traffic) at the Internet port 114 and an inbound secured traffic $T_{SEC,in}$ at the secured traffic port 116 and of outputting this (combined) inbound traffic at the LAN port 112 as inbound LAN traffic $T_{LAN,in}$. Of course, each of the physical ports 112, 114, 116 may consist of one or more separate physical ports.

Figure 2:
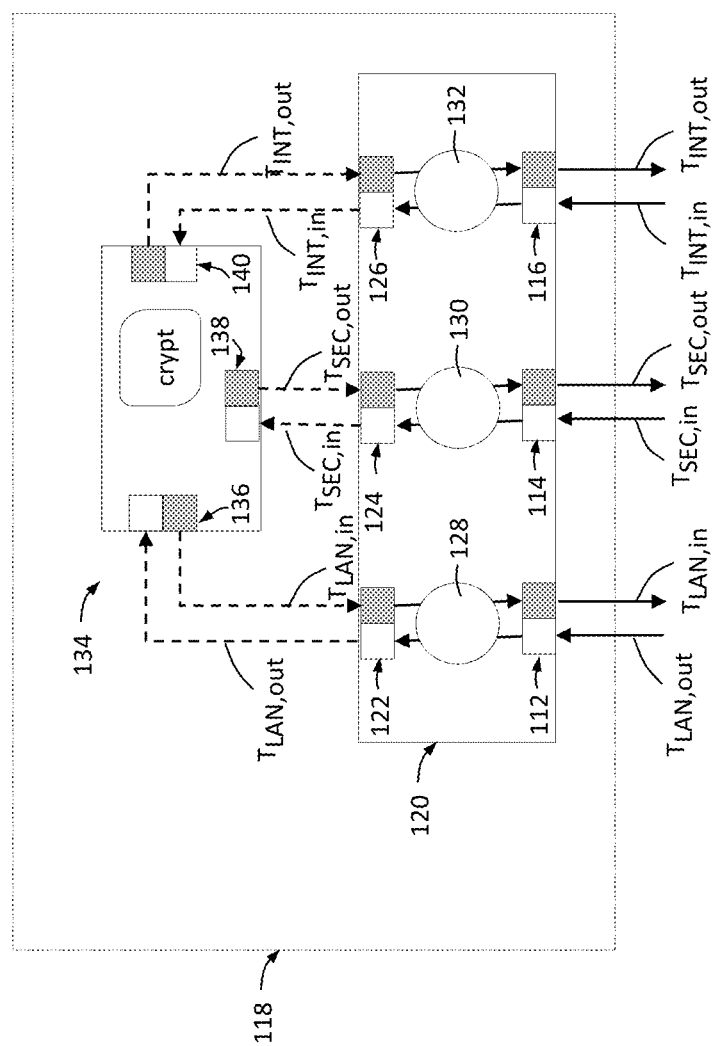
FIG. 2 shows a general schematic representation of a compute node of an SD-WAN for the WAN shown in FIG. 1.

FIG. 2 shows a compute node 118 that may be realized by each of the network devices 110 in FIG. 1 or, as the case may be, by each of the network devices 110 and further devices that may be provided in order to realize NFV. It shall be mentioned that all terms relating to NFV, e.g. the term "compute node", should be interpreted as defined by the European Telecommunications Standards Institute (ETSI).

Each of the compute nodes 118 comprises a virtual switch 120 that provides a first virtual port 122 that is associated to the LAN port 112, a second virtual port 124 that is associated to the secured traffic port 114 and a third virtual port 126 that is associated to the LAN port 116. Of course, the ports 112, 114 and 116 may be realized as any type of ports that is capable of receiving and transmitting data packets, e.g. Ethernet ports. The virtual switch is also capable of providing predefined flow controlling functionality between the respective physical port 112, 114, 116 and the associated virtual port 122, 124, 126. In FIG. 2, the flow controlling functionality that performs desired control tasks (including forwarding tasks) with respect to the inbound and/or outbound traffic is represented by the circles designated with the reference numbers 128, 130, 132. The flow controlling functionality may be realized by a flow controller comprising a combination of software or firmware and an appropriate hardware that is configured to perform the desired forwarding and control tasks. Such a software and/or hardware may be comprised by the network interface device 110.

A control task may for example be to measure or assess the latency of the data packets that are forwarded by the compute node 118. Another task may be to perform a security check or to perform a prioritization of selected data packets, for example by using class of service (CoS) information comprised within the data packets.

Each compute node 118 further comprises a virtual machine (VM) 134 that performs the desired switching operations as a VNF. For example, the VM 134 may be configured to split the outbound LAN traffic $T_{LAN,out}$ into the outbound secured traffic $T_{SEC,out}$ and the outbound Internet traffic $T_{INT,out}$ or to combine the inbound Internet traffic $T_{INT,in}$ and the inbound secured traffic $T_{SEC,in}$ into the inbound LAN traffic $T_{LAN,in}$. Of course, the virtual machine 134 may also be configured to extract or add control information to each of the traffics mentioned above. As shown in FIG. 2, the virtual machine 134 may also be configured to encrypt the portion of the outbound LAN traffic that is output, as outbound Internet traffic, in direction to the third virtual port and/or to decrypt the inbound Internet traffic that is received from the third virtual port.

In order to simplify matters, it is assumed for the embodiments described herein that the flow controllers 128, 130 and 132 do generally not change the information comprised by the traffics between the respective virtual and physical ports. Thus, as far as not otherwise mentioned, the traffic that is supplied from the first virtual port 122 to a first port 136 of the virtual machine 134 is the unchanged outbound LAN traffic $T_{LAN,out}$ and the inbound LAN traffic $T_{LAN,in}$ is identical with the traffic that is supplied from the first port of the virtual machine to the first virtual port. Further, the traffic that is supplied from the second virtual port to a second port 138 of the VM 134 is identical with the inbound secured traffic $T_{SEC,in}$ and the traffic supplied from the second port 138 of the VM 134 to the second virtual port is identical with the outbound secured traffic $T_{SEC,out}$. Finally, the traffic supplied from the third virtual port to a third port 140 of the VM 134 is identical with the inbound Internet traffic $T_{INT,in}$ and the traffic supplied from the third port 140 of the VM to the third virtual port is identical with the outbound Internet traffic $T_{INT,out}$. As far as the above explanation requires that a specific "traffic" is "unchanged" or "identical" with another traffic, this means that the payload of the respective traffic remains unchanged or is identical with the payload of the respective other traffic. In other words, the functionality provided by the virtual switch 120 or the flow controllers 128, 130 and 132, respectively, may of course change the other parts of the packets, especially the packet header.

FIG. 3 shows the compute node 118 according to FIG. 4, wherein the flows of data traffic in the outbound direction are explained in more detail. The outbound LAN traffic $T_{LAN,out}$ supplied to the physical LAN port 112 is supplied, via the flow controller 128, to the associated first virtual port 122 (which might also be designated as virtual LAN port) and from the first virtual port 122 to the first port 136 of the VM 134. The VM 134 splits the outbound LAN traffic $T_{LAN,out}$ into a first portion that is supplied to the second port 138 of the VM 134 and a second portion that is supplied to the third port of the VM 134. The first portion is supplied from the second port 138 of the VM 134 to the second virtual port 124 (which might also be designated as virtual secured traffic port) as outbound secured traffic $T_{SEC,out}$. The second portion is supplied from the first port 136 of the VM 134, after having been encrypted, via the third port 140 of the VM 134 to the third virtual port 126 (which might also be designated as virtual Internet port) as outbound Internet traffic $T_{INT,out}$. The outbound secured traffic $T_{SEC,out}$ received at the second virtual port 124 is supplied, via the flow controller 130, to the physical secured traffic port 114. The outbound Internet traffic $T_{INT,out}$ that is output at the third virtual port 126 is supplied, via the flow controller 132, to the physical Internet port 116.

In addition to the outbound traffic flows, FIG. 3 shows the inbound Internet traffic $T_{INT,in}$ that is received at the physical Internet port 116 and supplied, via the flow controller 132 and the third virtual port 126, to the third port 140 of the VM 134. In case the WAN 100, which is realized as a software defined WAN (SD-WAN), has already been infected due to an attack, a portion of the inbound Internet traffic that is received at the third port 140 of the VM 134 might be inadmissibly supplied to the second port 138 of the VM 134. In such a case, the outbound secured traffic $T_{SEC,out}$ does not only comprise a desired portion of the outbound LAN traffic $T_{LAN,out}$ and, as the case may be, additional control information created by the VM 134, but also inadmissible data packets that have been received from the (insecure or unsecured) Internet.

In order to detect such an inadmissible traffic portion or inadmissible data packets within the secured traffic $T_{SEC,out}$, the flow controller 128 and the flow controller 130 of the virtual switch 120, i.e. the respective hardware, software and/or firmware, are configured to perform the following functionality:

The flow controller 128 is configured to determine a dedicated signature information for each data packet of the outbound LAN traffic $T_{LAN,out}$ that carries payload data. This signature information is stored in an outbound LAN traffic table. Data packets that do not transport payload data, e.g. TCP/IP SYN packets, are forwarded through the flow controller 128 without determining a respective signature information.

The dedicated signature information is determined in such a way that it is unique for the respective data packet, especially for the payload data contained therein. Thus, the dedicated signature information will not be based on the content of a data packet that might be changed by applying switching functionality, i.e. especially the content of a packet header or packet trailer will usually not be used for determining the dedicated signature information.

The flow controller 130 is configured to perform a check on each data packet of the outbound traffic $T_{SEC,out}$ as to whether the data packets match the dedicated signature information contained in the outbound LAN traffic table. For this purpose, the flow controller 130 is also configured to determine the dedicated signature information of each packet of the traffic $T_{SEC,out}$ received from the second virtual port 124 applying the same method as the flow controller 128. After having determined the respective dedicated signature information, the flow controller 130 compares this information as to whether it is included in the outbound LAN traffic table. If so, the flow controller 130 cancels the respective entry, i.e. the respective dedicated signature information, in the outbound LAN traffic table. If not, the flow controller 130 uses this "no match" information for controlling the forwarding of the respective data packet as part of the outbound secured traffic to the physical secured traffic port 114 and/or for creating a SUSPICIOUS SOURCE alarm.

In case the check reveals no match, the respective data packet might be dropped. Of course, in practical applications only such packets should be dropped that contain payload data as in such a case a "no match" condition indicates that an inadmissible change of the payload data has been effected. Packets that do not contain any payload data, e.g.

TCP/IP SYN packets, should not be dropped as these are usually required to control the respective traffic or to initiate connections.

If dropping of the packets is not desired, in each "no match" case a SUSPICIOUS SOURCE alarm may be created by the flow controller 130. This alarm might for example be a signal that is supplied to any other instance, e.g. a physical or virtual device. The alarm may be used to attract the attenuation of network maintenance or administration personnel. Further, the alarm may be used to trigger other methods or functions of the WAN administration, e.g. routing the traffic via other compute nodes. As mentioned above, any non-matching packet, whether or not it is dropped, may be (additionally) forwarded to a monitoring port for further analysis or other purposes.

The flow controller 130 may also be configured to use a statistics for the number of "no match" cases that is used to decide whether a SUSPICIOUS SOURCE alarm shall be created. The statistics might be a moving average, i.e. the number of "no match" cases per time unit or per fixed number of packets received before the actual packet received. Especially, a SUSPICOUS SOURCE alarm may be created if the moving average exceeds a predefined threshold value.

It is, of course, also possible to define different levels of alarms or different types of alarms. For example, if a first (lower) threshold value defined by a statistics is exceeded, the respective (lower level) alarm may be used to drop the respective packet. If a further (higher) threshold value defined by the same statistics or another (higher or lower) threshold value defined by another statistics is exceeded, the whole outbound traffic may be interrupted. Also, just creating an alarm signal (and e.g. issuing a message on a display) is possible as a lower level SUSPICIOUS SOURCE alarm, and dropping non-matching packets or interrupting the whole traffic as a higher level SUSPICIOUS SOURCE alarm.

Admissible packets which are added to the outbound secured traffic $T_{SEC,out}$ by the VM 134 should of course not create an alarm and/or contribute to increasing the statistics used to determine as to whether an alarm should be created. For this purpose, the flow controller 130 may be configured to comprise information and/or have access to information that characterizes admissible data packets, e.g. packets of a control protocol created by the VM 134. This information can be stored in a storage or storage area that cannot be accessed by the VM 134 or any other virtual or physical machine. The storage or storage area can especially be comprised by the network interface device 110 shown in FIG. 1. In this way, an inadmissible manipulation of the information characterizing admissible (control protocol) data packets can be avoided. The information characterizing such admissible data packets may be a typical bit pattern comprised in the header of the data packets.

In this way, the method of determining, for each data packet received at the physical LAN port 112, a dedicated signature information, storing this information in an outbound LAN traffic table and checking as to whether each data packet of the outbound secured traffic $T_{SEC,out}$ received at the second virtual port 124 matches a dedicated signature information contained in the outbound LAN traffic table makes it possible to recognize payload data packets which have not been received as outbound LAN traffic $T_{LAN,out}$, or the data payload of which has been inadmissibly changed.

The outbound LAN traffic table may be used as follows: For each data packet of the outbound LAN traffic $T_{LAN,out}$ received at the physical LAN port 112, the flow controller 128 enters a respective dedicated signature information into the table. In case the flow controller 130 recognizes a match, the respective information in the table is deleted. As the outbound LAN traffic is split, only a portion thereof is received at the second virtual port 124. Thus, the flow controller 130 may be configured in such a way that all entries (if any) in the table are deleted which are older than the entry to be deleted due to a match. In this way, the length of the table can be reduced to the maximum number of packets received during a time interval that is equal to the maximum latency of the forwarding process (the latency is equal to the maximum time difference between receiving a data packet of the land traffic $T_{LAN,out}$ at the physical LAN port 112 and supplying this data packet to the physical secured traffic port 114).

In order to determine the dedicated signature information for a data packet, a hash function may be used, i.e. any function that maps data of a given arbitrary size to data of fixed size. The values returned by a hash function are called hash values. For example, a predefined number of bytes following the header of a packet (especially the IP header) can be used for hashing. The respective hash value is entered into the outbound LAN traffic table. The number of bytes used for hashing (or generally, for determining the dedicated signature information) may depend on the length of the packets (especially on the length of the payload).

As already mentioned, this method is not appropriate to detect inadmissible data packets that do not contain payload data. For this purpose, additional methods may be implemented, e.g. using counters for TCP/IP SYN and FIN packets. The flow controls 128 and 130 may for example be configured to use counters for SYN and FIN packets that are received at the physical secured traffic port 114 (included in the inbound secured traffic $T_{SEC,in}$) and transmitted to the physical secured traffic port 114 included in the outbound secured traffic $T_{SEC,in}$. In case the number of SYN packets received is greater than or equal to the number of SYN packets transmitted, an alarm may be created.

FIG. 4 shows the compute node 118 according to FIG. 2, wherein the inbound traffic is shown in more detail. As apparent from this Figure, the inbound Internet traffic $T_{INT,in}$ received at the physical Internet port 116 is supplied, via the flow controller 132 and the third virtual port 126, to the third port of the VM 134. The inbound secured traffic $T_{SEC,in}$ received at the physical secured traffic port 114 is supplied, via the flow controller 130 and the second virtual port 124, to the second port 138 of the VM 134. The VM 134 is configured to receive the inbound Internet traffic $T_{INT,in}$ at its third port 140, as the case may be, to decrypt this traffic and to combine the decrypted traffic, at its first port, with the inbound secured traffic received at its second port. The combined traffic is supplied, via the first virtual port 122 and the flow controller 128, to the physical LAN port 112 as inbound LAN traffic $T_{LAN,in}$.

The task of detecting inadmissible data packets or traffic within the inbound LAN traffic $T_{LAN,in}$ does usually not exist. However, the method of identifying the data packets that have been received at a specific physical port within a traffic comprising additional packets (which are received at a different physical port or which have been created by the VM) may be applied here for a different task, namely, for forwarding or treating the recognized data packets with a higher (or generally another) priority.

For this purpose, the flow controller 130 is configured to determine a dedicated signature information for all (payload) data packets of the inbound secured traffic $T_{SEC,in}$ received at the physical secured traffic port 114. This can be performed in the same manner as explained above, wherein the signature information is entered into an inbound secured traffic table. The flow controller 128 is configured to detect as to whether the packets received at the first virtual port 122 match the signature information included in the inbound secured traffic table. This check and the handling of the table can be performed similarly as explained above.

The information obtained by this checking method can be used to treat the packets that are detected as having been received at the physical secured traffic port 114 and the remaining packets, i.e. the packets of the inbound Internet traffic $T_{INT,in}$, in a differing manner. Especially, the data packets of the secured traffic portion comprised within the inbound LAN traffic can be treated with a higher priority. For example, these packets can be supplied to the physical LAN port 112 at any rate or by granting a lower latency than the remaining packets of the Internet traffic portion. Due to this prioritization, the drop rate for the packets or the latency for forwarding the packets of the Internet traffic portion may increase.

LIST OF REFERENCE SIGNS

100 WAN
102 first site, corporate network (LAN)
104 second site, branch office (LAN)
106 Internet connection
108 secured (MPLS) connection
110 network interface device
112 physical LAN port
114 physical secured traffic port
116 physical Internet port
118 compute node
120 virtual switch
122 first virtual port
124 second virtual port
126 third virtual port
128 flow controlling functionality/flow controller
130 flow control functionality/flow controller
132 flow control functionality/flow controller
134 virtual machine (VM)
136 first port of VM
138 second port of VM
140 third port of VM
$T_{LAN,out}$ outbound LAN traffic
$T_{LAN,in}$ inbound LAN traffic
$T_{INT,out}$ outbound Internet traffic
$T_{INT,in}$ inbound Internet traffic
$T_{SEC,out}$ outbound secured (MPLS) traffic
$T_{SEC,in}$ inbound secured (MPLS) traffic

The invention claimed is:

1. A method of forwarding data packets in a virtual switch of a software-defined wide area network (SD-WAN) environment, wherein the virtual switch comprises at least one first virtual port for receiving outbound LAN traffic ($T_{LAN,out}$) from and transmitting inbound LAN traffic ($T_{LAN,in}$) to at least one physical local area network (LAN) port, at least one second virtual port for receiving inbound secured traffic ($T_{SEC,in}$) from and transmitting outbound secured traffic ($T_{SEC,out}$) to at least one physical secured traffic port, and at least one third virtual port for receiving inbound Internet traffic ($T_{INT,in}$) from and transmitting outbound Internet traffic ($T_{INT,out}$) to at least one physical Internet port, the method comprising the steps of:

(a) determining, for each or at least selected data packets of the outbound LAN traffic ($T_{LAN,out}$) directed to the at least one first virtual port, a dedicated signature information based on the bits of the data packet;

(b) storing the signature information;

(c) outputting the outbound LAN traffic ($T_{LAN,out}$) at the first virtual port for processing by a virtual machine;

(d) receiving at least a portion of the outbound LAN traffic ($T_{LAN,out}$), as the case may be after having been further processed by the virtual machine, at the second virtual port as an outbound secured traffic ($T_{SEC,out}$) that is to be supplied to the at least one physical secured traffic port;

(e) examining each data packet of the outbound secure traffic ($T_{SEC,out}$) as to whether it matches the dedicated signature information and using the result of this check for controlling the forwarding of the respective data packet as part of the outbound secured traffic ($T_{SEC,out}$) to the at least one physical secured traffic port and/or for creating a SUSPICIOUS SOURCE alarm if a predetermined alarm condition is met.

2. The method according to claim 1, wherein, in a normal operating mode, the outbound secured traffic ($T_{SEC,out}$) is forwarded to the at least one physical secured port and, in case a SUSPICIOUS SOURCE alarm is created, only the packets matching the dedicated signature information and, as the case may be, the packets matching an exemption criterion are forwarded, or the outbound secured traffic ($T_{SEC,out}$) is interrupted.

3. The method according to claim 2, wherein the outbound secured traffic ($T_{SEC,out}$) is interrupted if a predetermined condition for a higher level SUSPICIOUS SOURCE alarm is met.

4. The method according claim 2, wherein at least one exemption criterion is comprised in an exemption criteria list, which is stored in a storage that is not accessible by a virtual machine providing virtualized network functions.

5. The method according to claim 1, wherein the SUSPICIOUS SOURCE alarms and/or the higher level SUSPICIOUS SOURCE alarms are created on the basis of a SUSPICIOUS SOURCE statistics, comprising information concerning the number of packets of the traffic examined not matching the dedicated signature information and, as the case may be, not matching an exemption criterion in a given preceding time interval or in a total number of preceding packets.

6. The method according to claim 5, wherein the SUSPICIOUS SOURCE statistics comprises the number of packets, which, in a given preceding time interval or in a total number of preceding packets, do not match the dedicated signature information and, as the case may be, do not match an exemption criterion, and wherein the SUSPICIOUS SOURCE alarm or the higher level SUSPICIOUS SOURCE alarm is created if a predetermined threshold value is exceeded.

7. A network interface device which is configured to define a virtual switch that comprises (a) at least one first virtual port which is configured to receive outbound LAN traffic ($T_{LAN,out}$) from and to transmit inbound LAN traffic ($T_{LAN,in}$) to at least one physical local area network (LAN) port, (b) at least one second virtual port which is configured to receive inbound secured traffic ($T_{SEC,in}$) from and to transmit outbound secured traffic ($T_{SEC,out}$) to at least one physical secured traffic port, and (c) at least one third virtual port which is configured to receive inbound Internet traffic ($T_{INT,in}$) from and to transmit outbound Internet traffic ($T_{INT,out}$) to at least one physical Internet port, wherein
(d) the network interface device is further configured to perform the method according to claim 1.

8. The network interface device according to claim 7, wherein the network interface device comprises computing hardware and software configured to perform a method of forwarding data packets in a virtual switch of a software-defined wide area network (SD-WAN) environment, wherein the virtual switch comprises at least one first virtual port for receiving outbound LAN traffic ($T_{LAN,out}$) from and transmitting inbound LAN traffic ($T_{LAN,in}$) to at least one physical local area network (LAN) port, at least one second virtual port for receiving inbound secured traffic ($T_{SEC,in}$) from and transmitting outbound secured traffic ($T_{SEC,out}$) to at least one physical secured traffic port, and at least one third virtual port for receiving inbound Internet traffic ($T_{INT,in}$) from and transmitting outbound Internet traffic ($T_{INT,out}$) to at least one physical Internet port, the method comprising the steps of:
(a) determining, for each or at least selected data packets of the outbound LAN traffic ($T_{LAN,out}$) directed to the at least one first virtual port, a dedicated signature information based on the bits of the data packet;
(b) storing the signature information;
(c) outputting the outbound LAN traffic ($T_{LAN,out}$) at the first virtual port for processing by a virtual machine;
(d) receiving at least a portion of the outbound LAN traffic ($T_{LAN,out}$), as the case may be after having been further processed by the virtual machine, at the second virtual port as an outbound secured traffic ($T_{SEC,out}$) that is to be supplied to the at least one physical secured traffic port;
(e) examining each data packet of the outbound secure traffic ($T_{SEC,out}$) as to whether it matches the dedicated signature information and using the result of this check for controlling the forwarding of the respective data packet as part of the outbound secured traffic ($T_{SEC,out}$) to the at least one physical secured traffic port and/or for creating a SUSPICIOUS SOURCE alarm if a predetermined alarm condition is met.

9. The network interface device according to claim 8, wherein the method further comprises storing, in addition to the signature information, information identifying the packet to which the signature information has been assigned.

10. A computer program product stored on a non-transitory computer readable medium comprising a program code which is configured to cause a computer to perform the method according to claim 1.

11. The method according to claim 1, further comprising storing, in addition to the signature information, information identifying the packet to which the signature information has been assigned.

12. A method of forwarding data packets in a virtual switch of a software-defined wide area network (SD-WAN) environment, wherein the virtual switch comprises at least one first virtual port for receiving outbound LAN traffic ($T_{LAN,out}$) from and transmitting inbound LAN traffic ($T_{LAN,in}$) to at least one physical local area network (LAN) port, at least one second virtual port for receiving inbound secured traffic ($T_{SEC,in}$) from and transmitting outbound secured traffic ($T_{SEC,out}$) to at least one physical secured traffic port, and at least one third virtual port for receiving inbound Internet traffic ($T_{INT,in}$) from and transmitting outbound Internet traffic ($T_{INT,out}$) to at least one physical Internet port, the method comprising the steps of:
(a) determining, for each or at least selected data packets of the inbound secure traffic ($T_{SEC,in}$) directed to the at least one second virtual port, a dedicated signature information based on the bits of the data packet;
(b) storing the signature information;
(c) outputting the inbound secure traffic ($T_{SEC,in}$) at the second virtual port for processing by a virtual machine;
(d) receiving at least a portion of the inbound secure traffic ($T_{SEC,in}$), as the case may be after having been further processed by the virtual machine, at the first virtual port as an inbound LAN traffic ($T_{LAN,in}$) that is to be supplied to the at least one physical LAN port;
(e) examining each data packet of the inbound LAN traffic ($T_{LAN,in}$) as to whether it matches the dedicated signature information and using the result of this check for controlling the forwarding of the respective data packet as part of the inbound LAN traffic ($T_{LAN,in}$) to the at least one physical LAN port.

13. The method according to claim 12, wherein the forwarding of the packets that match the dedicated signature information is performed with a higher priority level than the forwarding of the remaining packets.

14. The method according to claim 12, wherein a lower priority level allows a higher latency and/or a higher packet loss rate than a higher priority level.

15. The method according to claim 14, wherein the Hash function is applied to a predetermined portion of the payload data, e.g. to a predetermined number of bytes following the header of the packet.

16. The method according to claim 12, wherein the signature information is obtained by applying a Hash function on the respective data packet, wherein a respective Hash value is used as the signature information.

17. The method according to claim 12, wherein the secured traffic ($T_{SEC,in}$) is a multi-protocol label switching (MPLS) traffic and the physical secure traffic port is an MPLS port.

18. The method according to claim 12, further comprising storing, in addition to the signature information, information identifying the packet to which the signature information has been assigned.

* * * * *